Patented Mar. 6, 1951

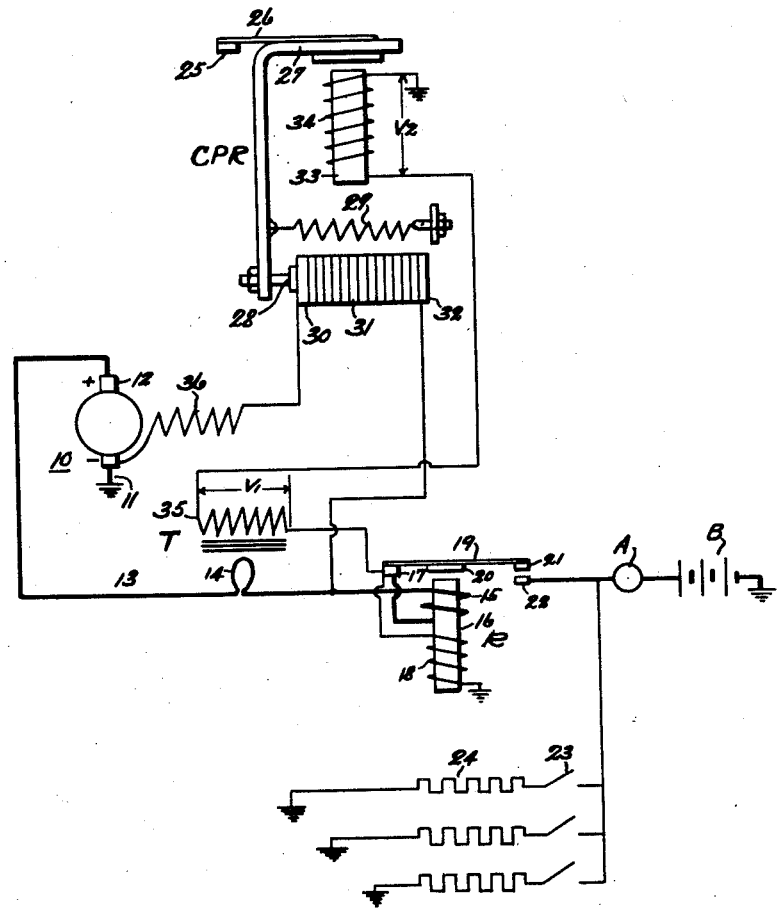

2,544,179

UNITED STATES PATENT OFFICE 2,544,179

GENERATOR REGULATOR

William J. Rady and Lyman A. Rice, Anderson, Ind., assignors to General Motors Corporation, Detroit, Mich., a corporation of Delaware Application February 16, 1949, Serial No. 76,824

1 Claim. (Cl. 320—32)

This invention relates to the regulation of D. C. generator by a carbon-pile regulator which controls generator field excitation.

An object of the invention is to prevent a surging action of the regulator when the generator load is changed. In the disclosed embodiment, this object is accomplished by the use of a transformer having a primary coil in the circuit from the generator to the battery and having a secondary winding in which a voltage is induced by a change in charging current resulting from change in current output to other current consuming devices. The secondary winding is in series with the control coil of the carbon-pile regulator and its voltage is subtracted algebraically from the voltage on the control coil to cause a damping effect which minimizes surging.

Further objects and advantages of the present invention will be apparent from the following description, reference being had to the accompanying drawings, wherein a preferred embodiment of the present invention is clearly shown.

In the drawings the single figure is a wiring diagram of the invention.

Referring to drawing, a generator 10 has a grounded negative brush 11 and a positive brush 12 connected by wire 13 with a single turn primary coil 14 of a transformer T connected with coil 15 surrounding core 16 of a reverse current cutout relay R and connected with a terminal 17 connected with a grounded coil 18 surrounding core 16. Terminal 17 supports a leaf spring 19 carrying an armature 20 and a contact 21 engageable with a contact 22 connected by ammeter A with a storage battery B which is grounded. Ammeter A is connected by switches 23 with current consuming devices represented by resistances 24 which are grounded. Coils 15 and 18 are in assisting relation while generator voltage is above battery voltage and in bucking relation when the battery tends to discharge through the generator.

A carbon-pile regulator CPR has support 25 for a leaf spring 26 attached to an armature 27 carrying an adjustable screw 28 which a spring 29 urges against an electrode disc 30 of a carbon pile 31 having a fixed electrode 32 connected with the generator brush 12 through the transformer coil 14. The core 33 of the regulator is surrounded by a coil 34 grounded at one end and connected at the other end with transformer secondary coil 35 connected with relay terminal 17. Carbon-pile electrode 30 is connected with generator field winding 36 connected with negative brush 11.

The battery charging circuit indicated by heavy lines includes generator 10, wire 13, coil 14, relay coil 15, contacts 21, 22 when closed, ammeter A and battery B. The generator field circuit includes brush 11, field coil 36, carbon pile 31, coil 14 and positive brush 12. The regulator control circuit includes coil 34 and means for retarding increase or decrease of current flow therein when generator load is respectively decreased or increased, said means including secondary winding 35 of transformer T whose primary winding 14 is in the line from the generator to the current consuming devices represented by resistances 24.

V2 represents voltage impressed on coil 34 and its value is generator terminal voltage less voltage drop through the connections between brush 12 and coil 34. V1 represents voltage induced in coil 35 when current in coil 14 changes. Coil 35 is so connected with coil 34 that, when current in coil 14 decreases, voltage V1 opposes voltage V2. Consequently when current in coil 14 increases, the polarity of voltage V1 is reversed and voltage V1 assists voltage V2.

When generator load is decreased, generator voltage tends to increase. A decrease in field current is necessary to limit generator voltage. If no dampening means, such as provided by transformer T, were used, increase of generator voltage, due to decrease in load, would cause rapid increase of current in coil 34 and the pressure on the carbon pile would be rapidly reduced and the field circuit would be practically open. Generator voltage and current in coil 34 would suddenly decrease and pressure on the carbon pile would suddenly increase. Field current would immediately increase and generator voltage would suddenly increase to an excessive value and the cycle of fluctuation from high to low voltage would continue. The regulator could not effect proper regulation and would soon be damaged due to repeated sparking between the carbon discs. To prevent this, during the time of decrease of generator load and current in primary coil 14 of transformer T, there is induced in coil 35 a voltage V1 of opposite polarity to voltage V2 so that current in coil 34 is prevented from increasing so rapidly as to cause excessive reduction of pressure on the carbon pile. This reduction in pressure will be slightly in excess of that required to give exactly the desired generator voltage. The regulator will then operate to reduce this voltage by reducing field current; and the generator voltage will drop slightly below the desired value. There will be some surging or fluctuation of voltages between values higher and lower than the desired voltage, but the fluctuation rapidly dies out since the damping means provided by transformer T introduces a decrement amplitude. Thus equilibrium is established in a whereby the oscillations successively decrease in relatively short time.

When generator load is increased by closing one or more of the switches 23, generator voltage tends to decrease. Therefore current in coil 34 decreases, and spring 29 is allowed to increase the pressure on the carbon pile so that its resistance is decreased and field current is increased so that the generator will produce the desired voltage. The damping means operates in this case to prevent too rapid decrease in current in coil 34 so that surging will be limited in amplitude and duration as in the case of reduction of generator load. During the increase in generator load, current in coil 14 increases and a voltage V1 is induced in coil 35 having polarity which is opposite to that which voltage V1 had when generator load was decreased. Therefore the voltage V1 is in assisting relation to voltage V2 and reduction of current in coil 34 to effect the requirement for greater field strength is retarded. Thus the damping means provided by transformer T again introduces a decrement with respect to oscillation of generator voltage between values lower and higher than desired; and this oscillation or surging quickly dies out and equilibrium is established quickly as in the case when generator load is decreased.

While the embodiment of the present invention as herein disclosed, constitutes a preferred form, it is to be understood that other forms might be adopted.

What is claimed is as follows:

A current generating system comprising a D. C. generator having a shunt field winding, a load circuit connected with the generator and having current consuming devices and switches for controlling them whereby the current output of the generator can be varied, a regulator including a carbon pile in series with the field winding, a spring for increasing pressure on the pile and an electromagnet for decreasing the pressure on the pile and having a magnet coil responsive to generator voltage, and means for modifying the action of the regulator coil and including a transformer having a primary winding in series with the current consuming devices and a secondary winding in series with the magnet coil and having polarity such that, when generator current output decreases, the induced secondary winding voltage bucks the voltage impressed on the magnet coil and such that, when generator current output increases, the induced secondary winding voltage aids the voltage impressed on the magnet coil.

WILLIAM J. RADY.
LYMAN A. RICE.

REFERENCES CITED

The following references are of record in the file of this patent:

UNITED STATES PATENTS

| Number | Name | Date |
|---|---|---|
| 782,340 | Hubbard | Feb. 14, 1905 |
| 1,082,110 | Creveling | Dec. 23, 1913 |
| 1,146,956 | Ricketts | July 20, 1915 |
| 1,205,181 | Fessenden, Jr. | Nov. 21, 1916 |
| 1,320,487 | Milne | Nov. 4, 1919 |
| 1,725,132 | Creveling | Aug. 20, 1929 |
| 1,933,858 | Keller | Nov. 7, 1933 |
| 2,235,330 | Pugh | Mar. 18, 1941 |
| 2,424,464 | Honeywell | July 22, 1947 |
| 2,427,809 | Rady et al. | Sept. 23, 1947 |